United States Patent [19]

Kellet et al.

[11] 4,257,814

[45] Mar. 24, 1981

[54] ACCELERATING AGENTS FOR ACCELERATING HARDENING OF CEMENT

[75] Inventors: William H. Kellet, Coalville; Peter S. Mills, Burton-on-Trent, both of England

[73] Assignee: Coal Industry (Patents) Limited, London, England

[21] Appl. No.: 52,142

[22] Filed: Jun. 26, 1979

Related U.S. Application Data

[62] Division of Ser. No. 903,804, May 8, 1978, abandoned.

[30] Foreign Application Priority Data

May 10, 1977 [GB] United Kingdom .............. 19554/77
Aug. 9, 1977 [GB] United Kingdom .............. 33327/77

[51] Int. Cl.$^3$ ................................................ C04B 7/02
[52] U.S. Cl. ........................................ 106/90; 106/97; 405/267
[58] Field of Search .................. 106/90, 97, 104, 315; 299/11; 405/266, 267

[56] References Cited

U.S. PATENT DOCUMENTS

| 3,759,044 | 9/1973 | Caron et al. | 405/267 |
| 3,799,787 | 3/1974 | Davis | 405/267 |
| 3,801,338 | 4/1974 | Whitaker | 106/315 |
| 3,973,978 | 8/1976 | Nakagawa et al. | 106/104 |
| 4,045,236 | 8/1977 | Bianchi | 106/90 |
| 4,059,963 | 11/1977 | Wayment | 299/11 |

*Primary Examiner*—James Poer
*Attorney, Agent, or Firm*—Stevens, Davis, Miller & Mosher

[57] ABSTRACT

An agent for accelerating hardening of cement for use in an underground mining installation employing concrete-like packs including run-of-mine coal. The agent comprises by weight one and a half parts triethanolamine, five parts sodium carbonate and one part potassium carbonate. Too rapid setting of quick setting cement is avoided by the agent because a slurry of cement in water is mixed with a slurry of agent and run-of-mine coal in bentonite in a mixer immediately before being added to a pack so that setting cement does not occur in pipes leading to the mixer.

7 Claims, 2 Drawing Figures

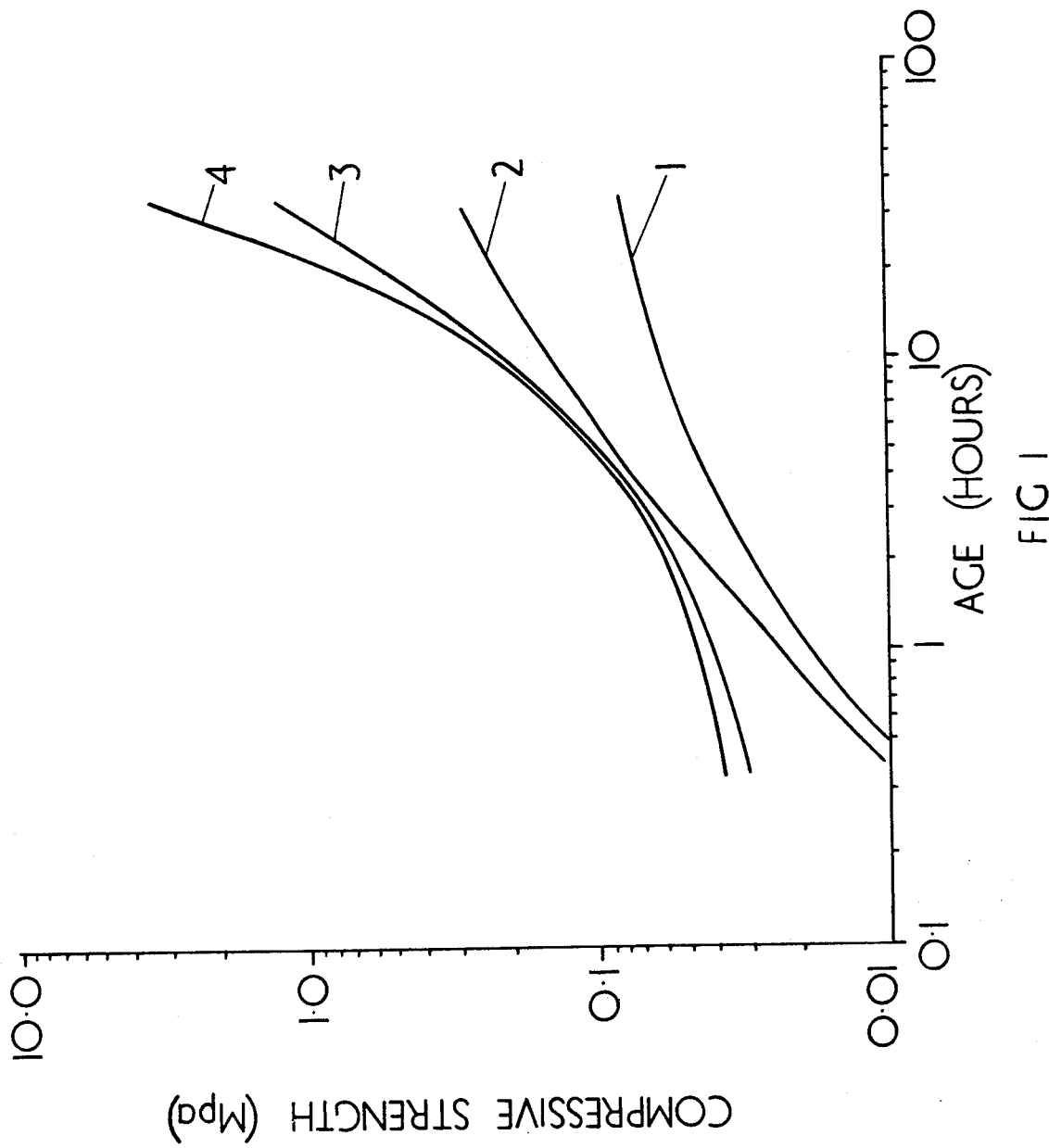

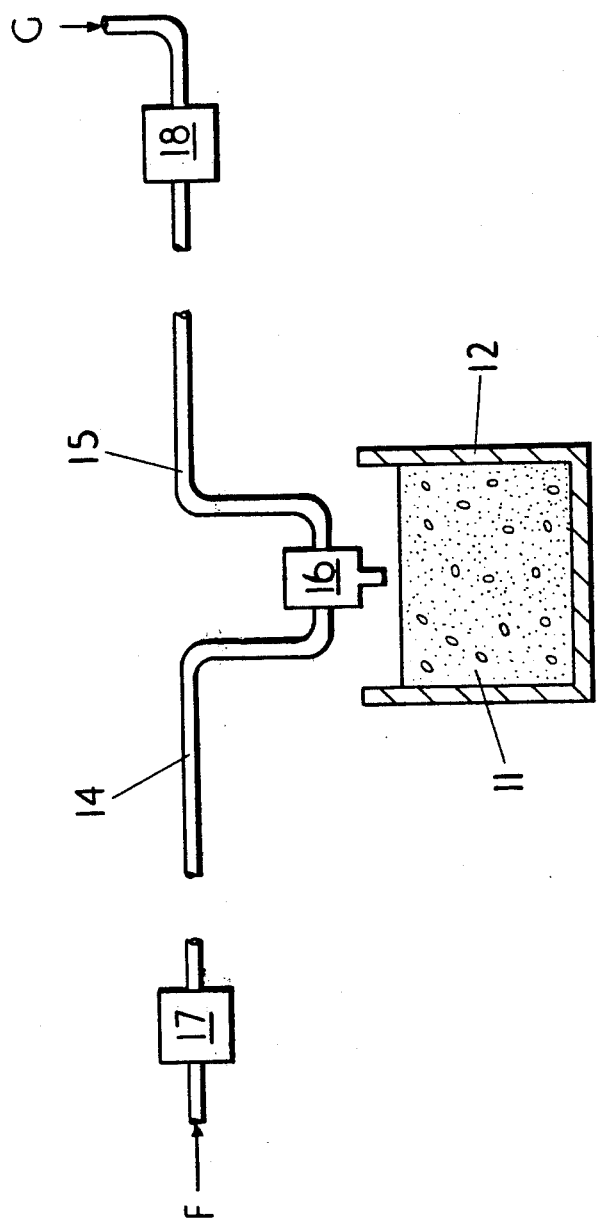

ACCELERATING AGENTS FOR ACCELERATING HARDENING OF CEMENT

This is a division of application Ser. No. 903,804 filed May 8, 1978, now abandoned.

This invention concerns accelerating agents for accelerating hardening of cement and such agents for use in an underground mining installation.

In an underground mining installation, mine roadways are formed by tunnelling machines and subsequently supported by a series of roof supports arranged along their length. In order to further support the mine roadways, it is common practice to position a plurality of mine packs adjacent to the mine roadways. These packs conveniently comprise a concrete-like material and are positioned consecutively as the mine roadway advances. The concrete-like material has to set so that it can provide sufficient strength to support the mine roadway within a preselected time, which is dependent upon the rate of advance of mineral workings since these workings are not permitted to progress more than a prescribed distance beyond the supported roadway.

Hitherto, quick setting cement has been used as a constituent of the concrete-like material so that the material sets or hardens at a sufficiently rapid rate, ordinary Portland cement not setting quickly enough to provide sufficient strength sufficiently soon to support the mine roadway.

Unfortunately, such quick setting cement is expensive and moreover its operational setting procedure may commence undesirably quickly with respect to the supply of the remaining constituents of the concrete-like material.

Furthermore, if operators using the quick setting cement omit to wash pipes soon enough after passage of the quick setting cement therethrough, then the pipes will be blocked and unusable for subsequent operations owing to the presence of set cement therein.

One of the objects of the present invention is to mitigate the above mentioned problems.

According to one aspect of the present invention, an accelerating agent for accelerating hardening of cement comprises triethanolamine and at least one alkali metal carbonate.

A preferred agent constitutes by weight one and a half parts triethanolamine, five parts sodium carbonate and one part potassium carbonate.

In operation the agent preferably reacts with cement in a ratio by weight of three parts agent to forty parts weight of cement.

According to another aspect, the present invention provides a method of preparing materials for at least partially filling a cavity in an underground mine comprising adding a first slurry including cement to the cavity and concurrently adding a second slurry including an agent for accelerating hardening of the cement and leaving the slurries to harden into a supportive concrete-like material in the cavity.

Preferably, the second slurry contains a dirt aggregate although the first slurry may contain the dirt aggregate or it may be apportioned between the first and second slurries. The agent is preferably constituted as defined above.

The dirt aggregate conveniently comprises run-of-mine coal or it may contain pit waste.

According to a further aspect, the present invention provides a supportive concrete-like material for at least partially filling a cavity in an underground mine comprising a first slurry including cement and a second slurry including an agent for accelerating hardening of the cement in combination the slurries forming the supportive concrete-like material within the cavity. The agent is preferably constituted as defined above.

The second slurry conveniently includes sodium bentonite.

The invention will now be described with reference to the accompanying drawings in which:

FIG. 1 is a graph showing performance characteristics of cement including an accelerator, and FIG. 2 is a diagrammatic drawing of equipment installed in an underground mine.

In an underground coal mine, it is necessary to provide permanent support for roadways leading to and from workings in the mine. The permanent support conveniently comprises a concrete-like material including run-of-mine coal and a cementitious mixture.

The concrete-like material supporting a particular roadway is required to harden or set sufficiently rapidly as to ensure that a coal face associated with the particular roadway does not advance further than a prescribed distance ahead of sufficiently hardened concrete-like material, since the concrete-like material cannot support the roadway until it is sufficiently hardened. Operators in the roadway would be placed in jeopardy if the coal face were to advance further than the prescribed distance ahead of the support roadway without adequate supports.

The constraints on the hardening rate of the concrete-like material outlined above, ensure that the roadway is safely supported apart from a portion thereof which is not sufficiently large as to be susceptible to breakage by forces exerted by neighbouring rock strata.

In order to achieve the required hardening rate a first slurry containing cement is added to a second slurry containing an agent for accelerating hardening of cement and suspended in sodium bentonite as will be described subsequently in connection with FIG. 2.

The suitability of an accelerating agent for use in the application outlined above and described in more detail subsequently is determined by testing as the agent must satisfy the parameters set out below.

The accelerating agent must meet stringent requirements before being allowed underground. For example, the agent must not be inflammable; it must have non-toxic combustion products, it must not be explosive or toxic itself or in combination with other materials employed underground.

Moreover the accelerating agent must not react with sodium bentonite so as to affect its gel properties to remove effective pumpability of the second slurry and of course the agent must accelerate the hardening of cement to the desired degree.

The following substances were tested inter alia for suitability as constituents of an agent for accelerating hardening of cement:

(a) anhydrous sodium silicate or fluorosilicate
(b) aluminium chloride,
(c) sodium hydroxide,
(d) lithium carbonate,
(e) ferrous or ferric nitrate,
(f) a mixture of triethanolamine, sodium carbonate and potassium carbonate
(g) mixtures of acetic acid or its salts and triethanolamine.

It was found that substance (a) was an irritant to operators and also that it slowly solidified slurries of sodium bentonite to which it was added and was therefore not suitable. Substance (b) causes a rapid hardening of cement but reacts dangerously exothermically and also destroys the gel structure of sodium bentonite and in consequence is also unsatisfactory. Substance (c), although an accelerator is unsuitable because it is highly caustic and destroys the gel properties of sodium bentonite. Substance (d) is a good accelerating agent and also does not affect the gel properties of sodium bentonite, but unfortunately it can exhibit hallucinogenic effects so that care would be required if using it. Substance (e) is suitable except that upon heating it releases toxic oxides of nitrogen and so cannot be used. Substance (f) was suitable. Substance (g) is a very effective cement accelerator when used in controlled conditions. However in an uncontrolled mine environment, too much accelerator might be used and testing showed that this would cause the early strength of the concrete-like material to be severely reduced.

In view of the foregoing triethanolamine, sodium carbonate and potassium carbonate comprise the preferred accelerating agent for accelerating hardening of cement.

The testing indicated the quantity of alkali metal carbonate when added to the triethanolamine increased the early and later strength of the ordinary Portland cement. Several blends of agent of type (f) accelerating the hardening of ordinary Portland cement were tested with the following grout:
1000 parts half inch coal fines
400 parts of a 15:1 ratio of water to bentonite
250 parts of ordinary Portland cement and
150 parts of water A representative four agents A, B, C and D of those tested are given below as a percentage by weight of the cement in the above grout.

A. 7% sodium carbonate, 0.25% triethanolamine
B. 2% sodium carbonate, 5% triethanolamine
C. 7% sodium carbonate, and
D. 5% sodium carbonate, 1% potassium carbonate and 1.5% triethanolamine The results of the four tests are given below in terms of uniaxial crushing strength after four hours and after twenty four hours:

|   | 4 Hours | 24 Hours |
| --- | --- | --- |
| A | 28 $kNm^{-2}$ | 1210 $kNm^{-2}$ |
| B | 35 $kNm^{-2}$ | 50 $kNm^{-2}$ |
| C | 20 $kNm^{-2}$ | 193 $kNm^{-2}$ |
| D | 72 $kNm^{-2}$ | 248 $kNm^{-2}$ |

From the above tests, it can be seen that a high concentration of alkali metal carbonate gives a high later strength and a high concentration of triethanolamine gives a relatively high early strength. As has been mentioned, triethanolamine does not affect the gel properties of sodium bentonite in the grout and testing shows that the alkali metal carbonates do not affect the gel properties to a degree sufficient to impair pumpability of slurries including bentonite, provided that sodium bentonite is pre-wetted.

Testing of the relative effectiveness of sodium and potassium carbonate is effected in the following manner. An agent comprising 5% triethanolamine and 2% sodium carbonate when used with a 0.8 water to cement ratio by weight of cement paste gives an initial set in 85 minutes and a final set of 115 minutes. An agent comprising 5% triethanolamine and 2% potassium carbonate gives an initial set in 41 minutes and a final set in 58 minutes. The testing is performed with a Vicat apparatus.

Although potassium carbonate is more effective than sodium carbonate at attaining early strength, the latter is preferred in the larger quantity because it is less caustic.

From performance testing and from price considerations a composition of agent which has tended to be more effective is by weight one and a half parts triethanolamine, five parts sodium carbonate and one part potassium carbonate. (i.e. D. above). The preferred agent is prepared by being crystallised out from aqueous solution.

This constitution of agent represents a compromise between fast setting and high strength at one day which is particularly suitable for accelerating ordinary Portland cement used in coal mines.

Referring now to FIG. 1 a performance graph is shown with compressive strength in Megapascals plotted as ordinate and age in hours as abscissa. Four curves 1, 2, 3 and 4 are shown on the graph each representing a mix comprising ordinary Portland cement and a different quantity of accelerator the quantities being in the case of curve 1, 3.75% by weight of cement; in the case of curve 2, 7.5% by weight of cement; in the case of curve 3, 11.25% by weight of cement and in the case of curve 4, 15% by weight of cement.

A study of the graph of FIG. 1 shows that the mix of curve 2 gives a similar compressive strength to the mixes of curves 3 and 4 after about 4 hours despite less agent being used.

Consequently, the ratio of agent to cement which is preferred is that of curve 2 i.e. three parts by weight of agent to forty parts by weight of ordinary Portland cement.

In practice, the quantity of agent added to the second slurry is governed by the type of cement which it will have to accelerate, the type and quality of dirt aggregate in the slurry and the quantity of water therein. These latter may vary considerably, because for example a band of dirt may have existed in the coal seam mined, thereby increasing the quantity of dirt in the aggregate. Consequently, it is found that that the weight of accelerator can vary between about two to fifteen percent of the weight of cement in the slurry. Nonetheless, the above mentioned figure of 7.5% represents the desired proportion.

Turning now to FIG. 2, formation of the concrete-like material shown at 11, is described in more detail. The concrete-like material is formed in situ in a cavity 12, defined by shuttering, which cavity can comprise a mine packhole arranged adjacent to a mine roadway (not shown). As the coal face advances, a succession of packholes is formed one after the other as new roadway is formed. Two pipes indicated at 14 and 15 respectively are adapted to feed into the packhole 12 via a mixing means 16. The first slurry comprising a mixture of cement and water is pumped through the pipe 14 by a pump 17. The first slurry is added to the pipe at a point generally indicated at F. The second slurry comprising a suspension of dirt aggregate, e.g. run-of-mine coal or pit waste and an agent for accelerating hardening of cement both suspended in sodium bentonite is pumped through the pipe 15 by a pump 18. The second slurry is added to the pipe 15 at a point generally indicated at G.

The first slurry does not set quickly so that after passage thereof through the pipe 14 has been effected, there is time for operators to wash out the pipe. The second slurry does not set at all since it comprises a dirt aggregate and the agent for hardening cement suspended in bentonite. Consequently, there is little danger of the pipes being filled with set cement and thereby being damaged.

The mixing means 16, which is not shown in detail, is provided to ensure that as far as possible material added to the packhole 12 is of a homogeneous nature. Of course, the provision of mixing means 16 is not essential to the invention as spattering of the first and second slurries upon entry into the packhole causes sufficient mixing. The mixing means merely enhances the mixing caused by spattering.

Furthermore the first slurry does not act so quickly as to prevent addition thereto of the second slurry if supply of the latter is interrupted through operational difficulties.

However, when the second slurry and the first slurry are mixed together in the packhole, then the agent for accelerating hardening of the cement acts upon the cement. Consequently the two slurries harden into the concrete-like material 11. The concrete-like material 11 attains sufficient strength to support the mine roadway within the prescribed time mentioned above.

The material of the present invention finds alternative application including the sealing off of mine roadways. In such an application the first and second slurries are added to a cavity defined by containing means such as boards, while containing means are positioned so as to block the mine roadway. When the boards are filled with the mixture, the mixture sets and thereby seals off the roadway.

From the above description it can be seen that the present invention mitigates the disadvantages found hitherto in supporting a mine roadway.

We claim:

1. A method of at least partially filling a cavity in an underground mine which method comprises the steps of
   (a) where required, defining said cavity using shuttering,
   (b) charging to said cavity a first aqueous slurry containing a hydraulic cement and concurrently charging and mixing with said first aqueous slurry a second aqueous slurry containing an agent for accelerating hardening of the hydraulic cement and
   (c) permitting the mixed slurries to harden into a supportive concrete-like material in the cavity.

2. A method as claimed in claim 1, wherein the second slurry contains a dirt aggregate.

3. A method as claimed in claim 1, wherein the first slurry contains a dirt aggregate.

4. A method as claimed in claim 2, wherein the dirt aggregate comprises run-of-mine coal.

5. A method as claimed in claim 1 wherein the agent comprises triethanolamine and at least one alkali metal carbonate.

6. A method as claimed in claim 5, wherein the agent comprises triethanolamine, sodium carbonate and potassium carbonate.

7. A method as claimed in claim 6 wherein the agent comprises by weight one and a half part triethanolamine, five parts sodium carbonate and one part potassium carbonate.

* * * * *